United States Patent [19]

Chorkey

[11] Patent Number: 4,526,202

[45] Date of Patent: Jul. 2, 1985

[54] VALVE WITH STRAIGHT THROUGH FLOW

[76] Inventor: William J. Chorkey, 34300 Lyncroft, Farmington, Mich. 48024

[21] Appl. No.: 491,271

[22] Filed: May 4, 1983

[51] Int. Cl.³ ................. F16K 11/02; F16K 31/122
[52] U.S. Cl. ..................... 137/625.66; 137/625.25; 137/625.6; 137/874
[58] Field of Search .......... 137/625.6, 625.66, 625.25, 137/874

[56] References Cited

U.S. PATENT DOCUMENTS

| | | | |
|---|---|---|---|
| 3,349,800 | 10/1967 | Herion et al. | 137/625.66 |
| 3,952,775 | 4/1976 | Ogata | 137/625.38 |
| 4,187,884 | 2/1980 | Loveless | 137/625.66 |
| 4,223,700 | 9/1980 | Jones | 137/874 |

FOREIGN PATENT DOCUMENTS 1213187  3/1966  Fed. Rep. of Germany ........................ 137/625.64

*Primary Examiner*—Edward G. Favors
*Attorney, Agent, or Firm*—Irvin L. Groh

[57] ABSTRACT

A reversing, fluid directional control valve having a valve body with an enclosed exhaust chamber therein and at least two oppositely disposed sides. One, or two outlet ports are formed through one of the two sides, and they communicate with the chamber, and an inlet port is formed through the other of the two sides and it communicates with the exhaust chamber. At least one exhaust port communicates the exhaust chamber to the exterior of the valve body. A conduit valve means is mounted in the exhaust chamber and has one end connected to the inlet port, with the other end being movable and provided with a slider valve element movable between two operating positions, either between the two outlet ports, or between an inlet port and a flow blocked position, for providing a straight through fluid flow path through the valve body, from the inlet port to at least one of the outlet ports. The outlet port or ports exhaust through the exhaust chamber to the exhaust port. The fluid directional control valve may be detachably mounted on a valve base, and it may be a three-way or four-way, two position, or a four-way, three position valve.

21 Claims, 28 Drawing Figures

VALVE WITH STRAIGHT THROUGH FLOW

TECHNICAL FIELD

This invention relates generally to the valve art, and more particularly to an improved directional fluid control valve which is constructed and arranged so as to provide a straight through flow of fluid from the inlet port to the outlet or cylinder ports, and from the outlet or cylinder ports to the exhaust ports. The valve of the present invention is adapted for use in air and hydraulic directional fluid control valves of the two-way, three-way or four-way, two-position, reversing type, the four-way, three-position reversing type, and the like, for directing fluid to control apparatuses, such as cylinders for operating machine tools and other industrial applications.

BACKGROUND ART

It is well known in the valve art that the most efficient flow path for pressure fluid entering a directional control valve and exiting out of an outlet or cylinder port in the valve is one which is as short as possible. Heretofore, two-way, three-way and four-way directional fluid control valves, and the like, ordinarily required a base member on which was mounted a body member carrying a valve spool member, and with the inlet and outlet passages extending through both the base member and the body member, and then back into the base member for outlet purposes. Such prior art valve structures require many right angle turns in the flow of the fluid through the valve. For example, in valves having the inlet port and exhaust ports on one side of a base member, and the outlet ports or cylinder ports on the other side of the base member, there are required at least a total of eight horizontal and vertical plane, right angle turns to be made by the fluid flowing through the valve, between the inlet port and the outlet or cylinder ports. U.S. Pat. No. 3,680,596 discloses a spool type reversing valve, which has a valve spool slidably mounted in a valve body, which is in turn mounted on a valve base. When the fluid passes through a valve such as that shown in the last mentioned patent, it must make many right angle turns, at each of which there is a major pressure loss or drop. In an attempt to decrease the number of right angle turns in a fluid flow circuit through a four-way, directional reversing valve, it has been heretofore proposed that a circular fluid flow path through the valve body be employed to increase the flow efficiency. Such a flow path is illustrated in U.S. Pat. No. 3,089,517. However, the circular fluid flow path employed in the last mentioned patent still employs many right angle turns. Another prior art directional reversing valve, with many right angle turns, is shown in U.S. Pat. No. 3,952,775.

DISCLOSURE OF THE INVENTION

In accordance with the present invention, a directional fluid control reversing valve is provided for use in air or hydraulic directional fluid control applications. The invention can be incorporated in a two-position, three-way, or a two or three-position, four-way directional, reversing type valve, for directing fluid to a control apparatus, such as a cylinder for machine tool operation, and other industrial applications. The valve of the present invention is constructed and arranged to provide for a straight through flow of fluid from the inlet port of a valve to an outlet or cylinder port, and from an outlet or cylinder port to an exhaust port.

In one embodiment of the present invention, the valve includes a body having an exhaust chamber formed therein which is open on the upper end thereof. A top plate encloses the upper end of the exhaust chamber in the valve body. An inlet port is formed in one of the walls of the valve body as, for example, the bottom end wall. A pair of outlet or cylinder ports is formed in the valve body in positions opposite to the disposition of the inlet port as, for example, in the top plate of the valve body. At least one exhaust port is formed through a wall of the valve body, as, for example, the wall in which is formed the inlet port. A flexible conduit valve means has one end connected to the inner end of the inlet port, and the other end is movable and includes a slider valve element for selectively directing fluid entering the inlet port, to flow through the valve body in a straight through fluid flow path to one of said outlet ports. The conduit valve means movable end with the slider valve element is selectively moved, by operator means, between the outlet ports for moving the slider valve element in one direction, and then back in the other direction, in a reversing and slidable manner. The straight through fluid flow valve of the present invention is advantageous because it is simple in structure, efficient in operation, and economical to manufacture. Another advantage of the valve of the present invention with the straight through fluid flow path, is that it may be quickly and easily repaired at a minimum of cost, and it may be used in a stacked arrangement, as well as on a detachable base.

BEST MODE OF CARRYING OUT THE INVENTION

Figure 1:
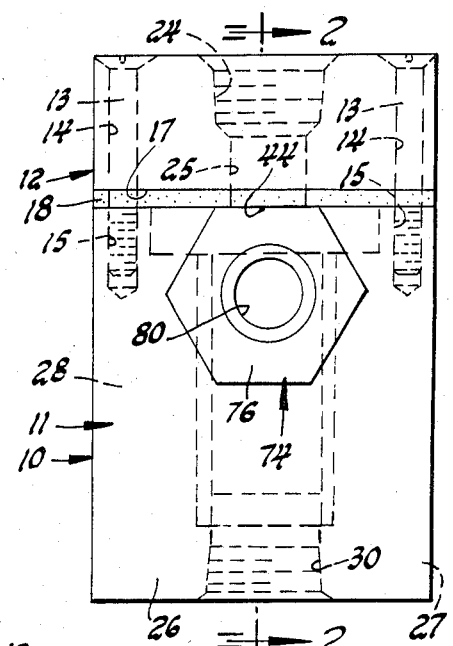
FIG. 1 is an end elevation view of a four-way, two-position directional fluid control, reversing valve, constructed and arranged to provide a straight through flow path between the inlet port and the outlet or cylinder ports.
Figure 2:
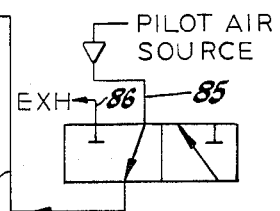
FIG. 2 is an elevation section view of the directional fluid control, reversing valve structure illustrated in FIG. 1, taken along the line 2—2 thereof, looking in the direction of the arrows, and showing the slider valve element in a first operating position with the pilot air off.
Figure 2:
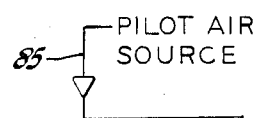
Figure 2:
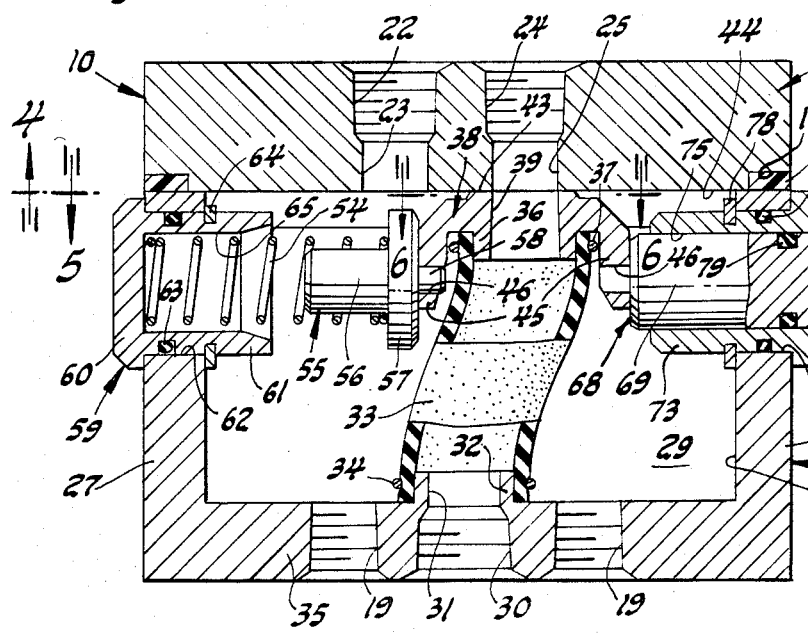

Referring now to the drawings, and in particular to FIGS. 1 and 2, the numeral 10 generally designates a four-way, two-position directional fluid control, reversing valve having a straight through flow path, and made in accordance with the principles of the present invention. The valve 10 includes a valve body, generally indicated by the numeral 11, which is open at the upper end thereof, and which has mounted on the upper end thereof a top plate, generally indicated by the numeral 12. The top plate 12 is releasably secured to the valve body 11 by a plurality of suitable machine screws 13, which pass through bores 14, formed through the top plate 12, and into threaded engagement with bores 15 formed in the upper end of the valve body 11.

Figure 5:
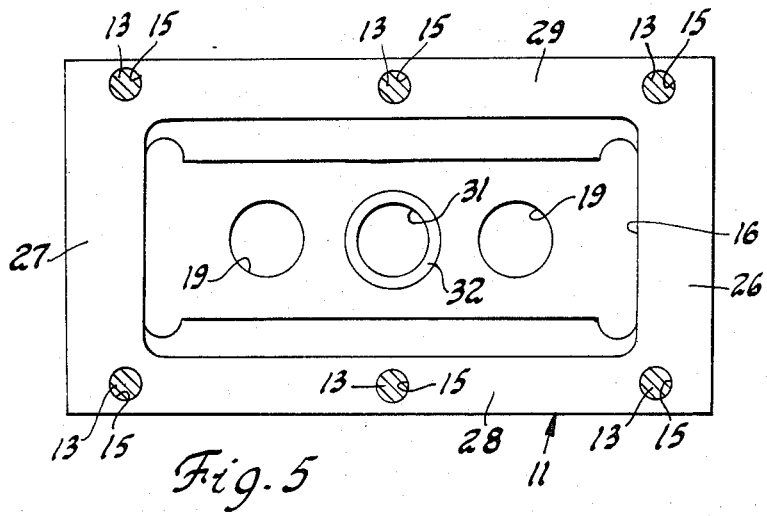
FIG. 5 is a top plan view of the valve body structure illustrated in FIG. 2, with the internal parts removed, taken along the line 5—5 thereof, and looking in the direction of the arrows.

As shown in FIGS. 2 and 5, the valve body 11 is provided with an internal exhaust chamber 16, which is open at the upper end thereof and enclosed by the top plate 12. A suitable seal member 18 is mounted around the upper end periphery of the body 11, and it is disposed in a suitable peripheral or circumferential recess 17 formed in the lower side 44 of the top plate 12. A pair of threaded exhaust ports 19 are formed through the bottom end wall 35 of the valve body 11. The valve 10 is provided with a pair of threaded outlet or cylinder ports 22 and 24 which are formed in the upper plate 12, and they communicate at their inner ends with the exhaust chamber 16 by means of the passages 23 and 25, respectively.

As seen in FIG. 5, the valve body 11 includes an integral pair of side walls 26 and 27, and an integral pair of front and rear walls 28 and 29. The valve body 11 is provided with a threaded inlet port 30 for connection to a suitable source of fluid under pressure as, for example, a source of pressurized air or pressurized hydraulic fluid. The inlet port 30 is formed through the valve body bottom end wall 35 in a position between the two exhaust ports 19. An inwardly extended, integral tubular flange 32 surrounds the inner end of the inlet port 30, and it has a passage 31 therethrough which communicates with the exhaust chamber 16.

As shown in FIG. 2, the valve 10 includes a conduit valve means that comprises a flexible, tubular conduit 33 and a slider valve element, generally indicated by the numeral 38. The conduit 33 has its lower end mounted around the tubular flange 32, and it is fixedly secured thereto by any suitable retaining means, as by a retainer wire ring 34. The upper end of the flexible tubular conduit 33 is movable and it is secured by any suitable retaining means, as by a similar retainer wire ring 37, around the cylindrical, integral, tubular projection 36 on the lower side of the slider valve element 38. The conduit 33 may be made from any suitable material, as for example, elastomeric, rubber, flexible metal, plastic and the like. The slider valve element 38 has a passage therethrough, indicated by the numeral 39, which communicates at its upper end with the lower end of the outlet or cylinder passage 25 when the slider valve element 38 is in the first operating position shown in FIG. 2.

Figure 3:
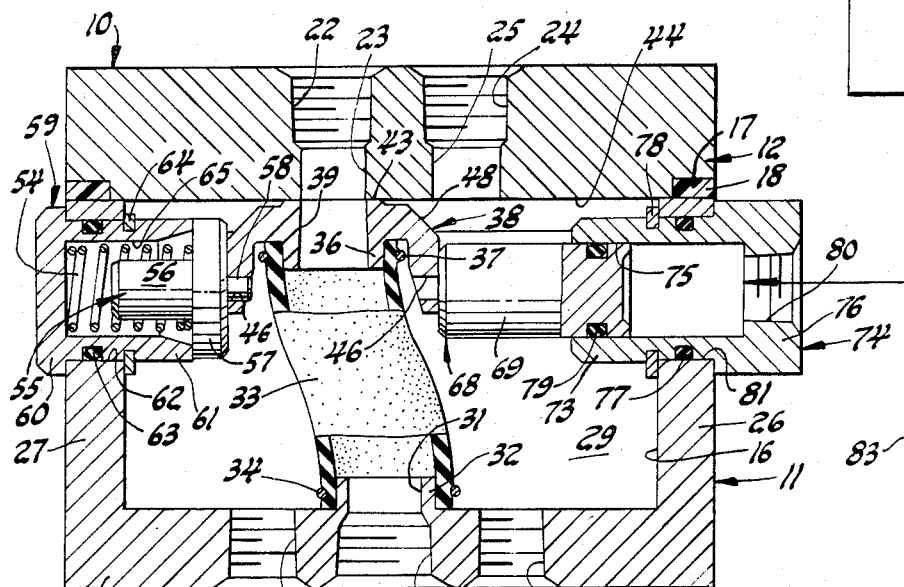
FIG. 3 is an elevation section view, identical to FIG. 2, and showing the directional fluid control, reversing valve structure with the slider valve element shifted to a second operative position by the application of pressurized pilot air.
Figure 6:
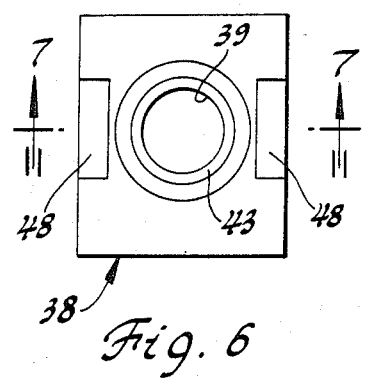
FIG. 6 is a top plan view of the slider valve element employed in the invention.
Figure 7:
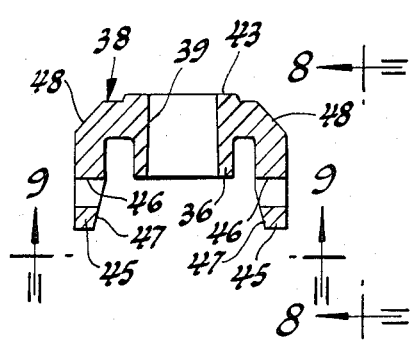
FIG. 7 is an elevation section view of the slider valve element illustrated in FIG. 6, taken along the line 7—7 thereof, and looking in the direction of the arrows.
Figure 8:
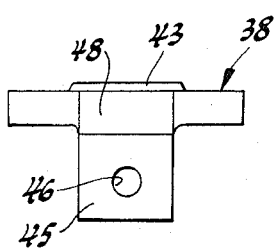
FIG. 8 is a side elevation view of the slider valve element illustrated in FIG. 7, taken along the line 8—8 thereof, and looking in the direction of the arrows.
Figure 9:
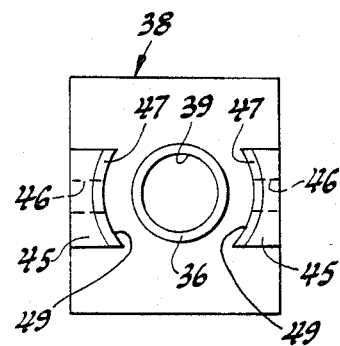
FIG. 9 is a bottom plan view of the slider valve element illustrated in FIG. 7, taken along the line 9—9 thereof, and looking in the direction of the arrows.

As shown in FIGS. 2 and 6, the slider valve element 38 has an overall rectangular shape, and the longitudinal passage 39, which extends therethrough, is surrounded at its upper end by an annular flat lip member 43, which slidably engages the lower surface 44 of the top plate 12 when it is shifted between the first operating position shown in FIG. 2, and the second operating position shown in FIG. 3. As best seen in FIGS. 7, 8 and 9, the slider valve element 38 is provided with a pair of integral, symmetrical, oppositely disposed, and downwardly extended legs 45. A transverse bore 46 is formed through each of the integral legs 45. The bores 46 are axially aligned with each other. As shown in FIG. 9, the inner faces 49 of the integral legs 45 are concavely formed, and the lower inner ends thereof are tapered downwardly and outwardly, as indicated by the numerals 47. As shown in FIGS. 6, 7 and 8, a pair of downwardly and outwardly sloping recesses 48 are formed in the top surface of the slider valve element 38, in diametrical opposite positions over the legs 45.

As shown in FIG. 2, the slider valve element 38 is moved to the first operating position, and held at said position, by an operator biasing means, as return spring 54, which has its inner end seated around an axial pin 56 of a spring retainer pin assembly, generally indicated by the numeral 55. The spring retainer pin assembly 55 includes an enlarged diameter flange 57, which is integrally formed on the inner end of the pin 56. An integral and reduced diameter pin 58 is formed on the inner side of the enlarged diameter flange 57, and it is formed to a diameter small enough to be slidably mounted in the bore 46 in the adjacent leg 45 of the slider valve element 38. The outer end of the return spring 54 is supported by a spring retainer, generally indicated by the numeral 59. The spring retainer 59 includes an outer end wall 60 which carries an integral cylindrical body 61 that is seated in a bore 62, that extends through the side wall 27. A suitable annular seal 63 is mounted in an annular recess formed in the outer periphery of the cylindrical spring retainer body 61. The spring retainer 59 is retained in its operative position in the bore 62, in the valve body wall 27, by means of a suitable releasable retainer ring 64. The spring retainer body 61 is provided with an axial recess 65, which extends from the inner end thereof outwardly toward the outer end wall 60. The outer end wall 60 overlaps the outer periphery of the spring retainer body 61 to provide an annular flange that seats against the outer face of the valve body wall 27.

As shown in FIG. 2, the valve 10 includes a cylindrical piston-type operator, generally indicated by the numeral 68, which has a solid, cylindrical body 69 that is slidably mounted in an operator holder, generally indicated by the numeral 74. As shown in FIG. 2, the operator holder 74 includes an elongated, cylindrical body member 73, and an enlarged diameter outer head member 76. The junction point between the body member 73 and the head member 76 forms an annular transverse face which is adapted to be seated against the outer face of the valve body side wall 26. The operator holder body 73 extends through a bore 81 formed through the valve body side wall 26, and it is releasably secured in place by a releasable retainer ring 78. A suitable annular seal 77 is mounted in a groove around the periphery of the operator holder body member 73, and it engages the periphery of the hole 81. The operator cylindrical body 69 is slidably mounted in a bore 75 in the operator holder 74. The bore 75 extends outwardly from the inner end of the operator holder body 73, and it communicates at its outer end with a threaded inlet port 80. A suitable annular seal 79 is mounted in a groove around the periphery of the inner end of the operator elongated cylindrical body 69, and it sealingly engages the wall of the operator holder bore or chamber 75.

In use, it will be seen that the slider valve element 38 may be moved from its first operating position shown in FIG. 2, to the left, as viewed in FIG. 3, against the pressure of the return spring operator 54. The movement of the slider valve element 38 to the second operating position position of FIG. 3 is effected by conducting pressurized pilot air into the chamber or cylinder 75 against the right or outer end of the generator piston 68, to move the slider valve element 38 from the first operating position shown in FIG. 2 to the second operating position shown in FIG. 3.

It will be seen that the longitudinal axes of the inlet port 30 and the outlet ports 22 and 24 are co-planar, and that when the slider valve element 38 is in the first operating position shown in FIG. 2, the pressurized fluid from a suitable source of the same may enter the inlet port 30, and pass through the passage 31 and through the tubular conduit 33, and through the passages 39 and 25, and out the cylinder or outlet port 24 in a straight through flow path, without the need for making any right angle turns, on either a horizontal plane or a vertical plane. Simultaneously, fluid is exhausted from the apparatus being controlled by the valve 10, through a flow path from said apparatus and the cylinder port 22, and into the exhaust chamber 16, and out the exhaust ports 19. When the slider valve element 38 is moved to the second operating position, shown in FIG. 3, pressurized fluid is conducted from the inlet port 30 and through the conduit 33 and out the cylinder or outlet port 22 in a similar straight through flow path. Simultaneously, fluid is exhausted from the apparatus being controlled by the valve 10, through a flow path from said apparatus and the cylinder port 24, and into the exhaust chamber 16, and out the exhaust ports 19.

As illustrated in FIG. 2, pressurized pilot air is conducted to the pilot air inlet port 80 by a suitable conduit 83, which is connected to a suitable directional control valve, generally indicated by the numeral 84. The directional control valve 84 is a conventional type valve, and has an exhaust line 86, and a supply line 85 connected to a suitable source of pressurized pilot air. When the directional control valve 84 is in the first operating position shown in FIG. 2, the pilot air would be exhausted from the operator chamber 75. When the directional control valve 84 is moved to the right, as viewed in FIG. 2, by any suitable means, as by a manual means or a solenoid operated means, the operator chamber 75 would be connected to the source of pilot air by the supply line 85, and pressurized pilot air would be conducted into the same for moving the operator 68 to the left, to move the slider valve element 38 to the second operating position shown in FIG. 3. When it is desired to move the slider valve element 38 back to its first operating position, shown in FIG. 2, the directional control valve 84 is reversed to move it back to the position shown in FIG. 2, so as to cut off the supply of pressurized pilot air to the operator chamber 75 and to exhaust the pressurized air that is within that chamber, and permit the return spring 54 to return the slider valve element 38 to the first operating position shown in FIG. 2.

Figure 4:
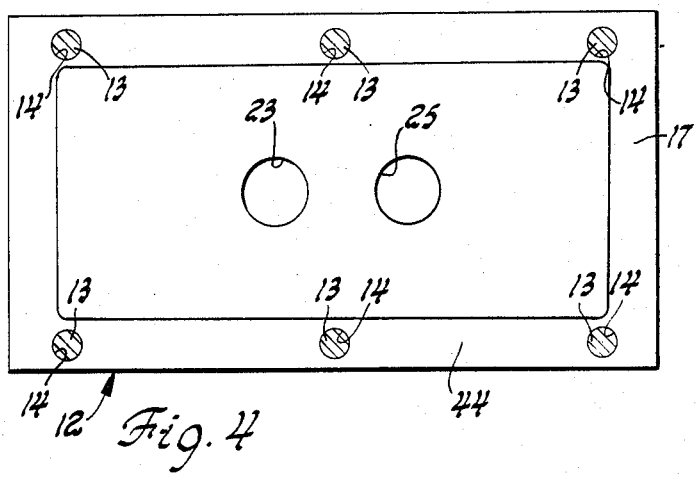
FIG. 4 is a bottom plan view of the top cover plate structure illustrated in FIG. 2, taken along the line 4—4 thereof, and looking in the direction of the arrows.

The circular lip 43 slidably engages the lower surface 44 of the top plate 12 throughout the sliding travel path of the valve element 38, and they are each provided with a very fine finish, since a metal to metal contact occurs at this point. The valve body 11, the top plate 12 and the slider valve element 38 may be made from any suitable material as, for example, a metal, as stainless steel, a hard coated aluminum, and the like. It will be understood that the sealing contact between the circular lip 43 of the slider valve element 38 and the lower face 44 of the top plate 12 is also assisted by the pressure of the operating fluid in the flexible conduit 33. The pressure of the fluid in the flexible conduit 33 provides a pressure assist seal between the slider valve element circular lip 43 and the top plate lower surface 44, due to the difference in internal cross section area of the tubular conduit 33 and the cross section area of the passage 39 through the slider valve element 38. In one embodiment, wherein the pressure of the working fluid in the tubular conduit 33 was 100 lbs/sq.in., a pressure assist seal of approximately 11 pounds was produced, which added to the sealing action between the slider valve element circular lip 43 and the lower surface 44 of the top plate 12. It will be understood that the amount of pressure assist will vary with the size of the valve and the area available for engagement by the pressure of the working fluid in the conduit 33. If desired, any suitable type of seal means may also be employed for a seal between the top plate lower surface 44 and the circular lip 43, and an illustrative seal is described hereinafter. As shown in FIG. 4, the passages 23 and 25 in the top plate 44 are circular in cross section, and the passage 39 in the slider valve element 38 is provided with the same cross section shape.

Figure 10:
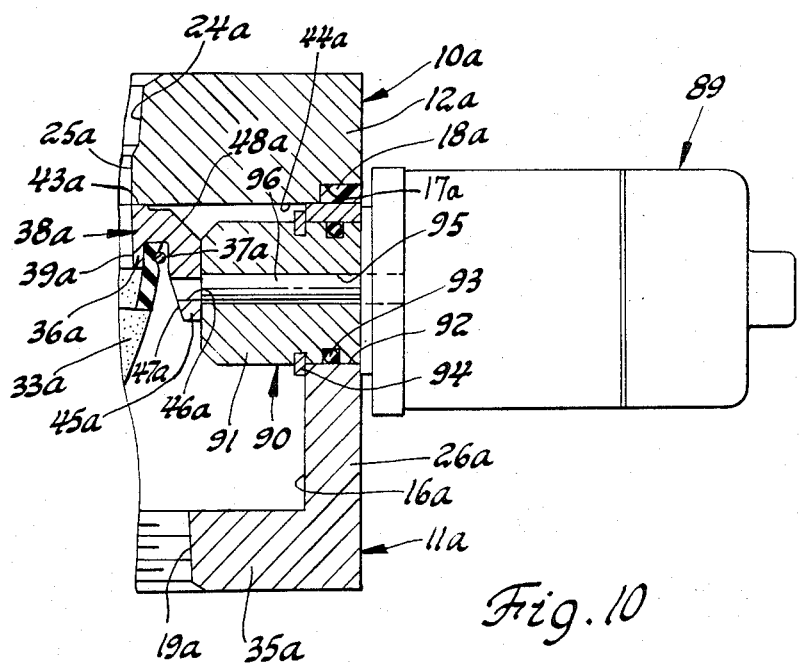
FIG. 10 is a fragmentary, elevation section view of the right end of the valve structure illustrated in FIGS. 1 and 2, and showing a modified means for moving the slider valve element in one direction against the pressure of the return spring.

FIG. 10 illustrates another type of slider valve element shifting means which may be used with a valve made in accordance with the invention. In the embodiment of FIG. 10, the function of the pilot air operating means of the first embodiment of FIGS. 1 through 9 is carried out by a directly operated electrical solenoid, generally indicated by the numeral 89. In the embodiment of FIG. 10, the parts thereof which are the same as the parts of the first embodiment of FIGS. 1 through 9 have been marked with the same reference numerals, followed by the small letter "a". It will be understood that a return spring 54 would be used to return the slider valve element 38a to the first operating position shown in FIG. 10. The solenoid 89 may be any conventional solenoid which is provided with a cylindrical mounting member, generally indicated by the number 90. The solenoid mounting member 90 has an elongated, cylindrical body 91 which is seated through a bore 92 that is formed through the cylinder body wall 26a. The solenoid mounting member body 91 is fixedly secured to the housing of the solenoid 89, and it is fixed in place in the bore 92 by a suitable, releasable retainer ring 94. A suitable annular seal 93 is mounted in a groove around the periphery of the cylindrical body 91 of the solenoid mounting member 90. The solenoid 89 is provided with an axially movable, elongated operator shaft 96 which extends through an axial bore 95 that extends through the cylindrical mounting body 91. The outer end of the solenoid shaft 96 abuts the adjacent slider valve element leg 45a.

In use, when the solenoid 89 is energized, the solenoid operator shaft 96 is moved to the left, and the slider valve element 38a is moved to the second operating position. When the solenoid 89 is de-energized, a return spring 54, as used in the first embodiment, returns the slider valve element 38a to the first operating position shown in FIG. 10.

Figure 11:
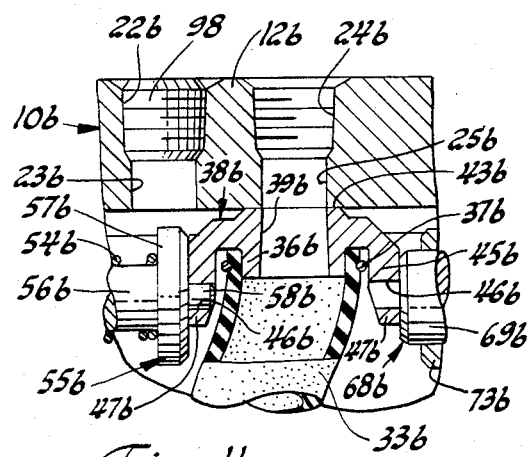
FIG. 11 is a fragmentary, elevation section view of the valve structure illustrated in FIG. 2, and showing the left outlet port provided with a threaded pipe plug to convert the four-way valve of FIG. 2 into a normally open, three-way, two-position valve.

FIG. 11 is a fragmentary, elevational section view of the valve structure illustrated in FIG. 2 and showing the left outlet 22b port provided with a threaded pipe plug 98 to convert the four-way valve of FIG. 2 into a normally open, three-way valve. The three-way valve is illustrated generally as 10b. The illustrated parts of the three-way valve 10b of FIG. 11 which are the same as the four-way valve 10 of FIG. 2 are marked with the same reference numerals followed by the small letter "b". It will be understood that the three-way valve 10b illustrated in FIG. 11 would employ all of the valve structure as illustrated in the four-way valve of FIG. 2, including a return spring means and the operator means for moving the slider valve element 38b between the first operating position and the second operating position, and then back to the first operating position, in the same manner as employed in the operation of the four-way valve 10 of FIG. 2.

FIG. 11 illustrates the threaded pipe plug 98 mounted in the threaded left outlet port 22b. The slider valve element 38b is shown in a first operating position in FIG. 11, and it is retained therein by the same type of return spring means as illustrated in FIG. 2. The inlet port for the normally open, three-way valve 10b would be the same as in the embodiment of FIG. 2, and the flow of operating pressurized fluid from the inlet port would be straight through the flexible conduit 33b and out through the right outlet port 24b. The operator means for moving the slider valve element 38b would be the same as the operator means employed in the four-way valve 10 of FIG. 2, and when it is energized by pressurized pilot air, the slider valve element 38b would be moved to the left, to the second operating position, in the same manner as in the embodiment of FIG. 4, to align the slider valve element 38b with the passageway 23b, which is blocked or closed by the threaded pipe plug 98 in the outlet port 22b. Accordingly, the three-way valve 10b would be in a closed position when it is moved to the left, to the second operating position, which would be the same position of the slider valve element 38 in the four-way valve 10 in FIG. 3.

Figure 12:
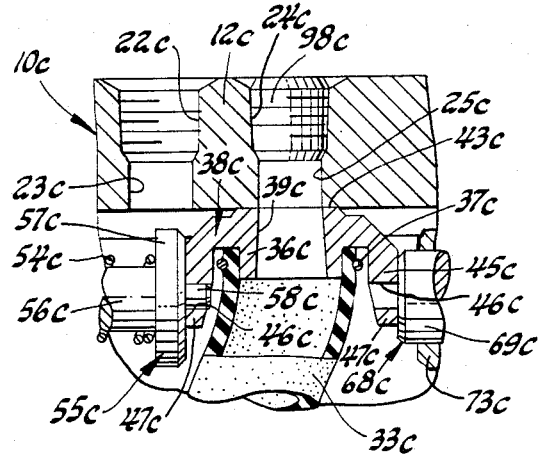
FIG. 12 is a fragmentary, elevation section view of the valve structure illustrated in FIG. 2, and showing the right outlet port provided with a threaded pipe plug to convert the four-way valve of FIG. 2 into a normally closed three-way valve.

FIG. 12 is a fragmentary, elevational section view of the four-way valve 10 illustrated in FIG. 2, and showing the right outlet port 24c provided with a threaded pipe plug 98c to convert the four-way valve 10 of FIG. 2 into a normally closed, three-way valve 10c. The illustrated parts of the three-way valve 10c of FIG. 12 which are the same as employed in the four-way valve 10 of FIGS. 2 and 3 have been marked with the same reference numerals followed by the small letter "c".

As illustrated in FIG. 12, the slider element 38c is retained in a first operating position by the same spring return means as employed in the four-way valve 10 of FIGS. 2 and 3. In the first operating position shown in FIG. 12, the flow of operating pressurized fluid from the inlet port would be blocked from flowing through the right outlet port 24c by the threaded pipe plug 98c. The operator means for moving the slider valve element 38c from the first operating position shown in FIG. 12 to the left, to the second operating position, in alignment with the left outlet port 22c, would be the same type of pilot air operator means employed in the four-way valve 10 of FIGS. 2 and 3. Accordingly, when the slider valve element 38c is moved to the left, to the second operating position, the pressurized operating fluid would pass from the inlet port, which would be the same as in the embodiment of FIGS. 2 and 3, and through the flexible conduit 33c and out the open outlet port 22c. When the pilot air is removed from the operator means, a return spring means as employed in the embodiment of FIGS. 2 and 3 would return the slider valve element 38c to the first operating position shown in FIG. 12.

Figure 13:
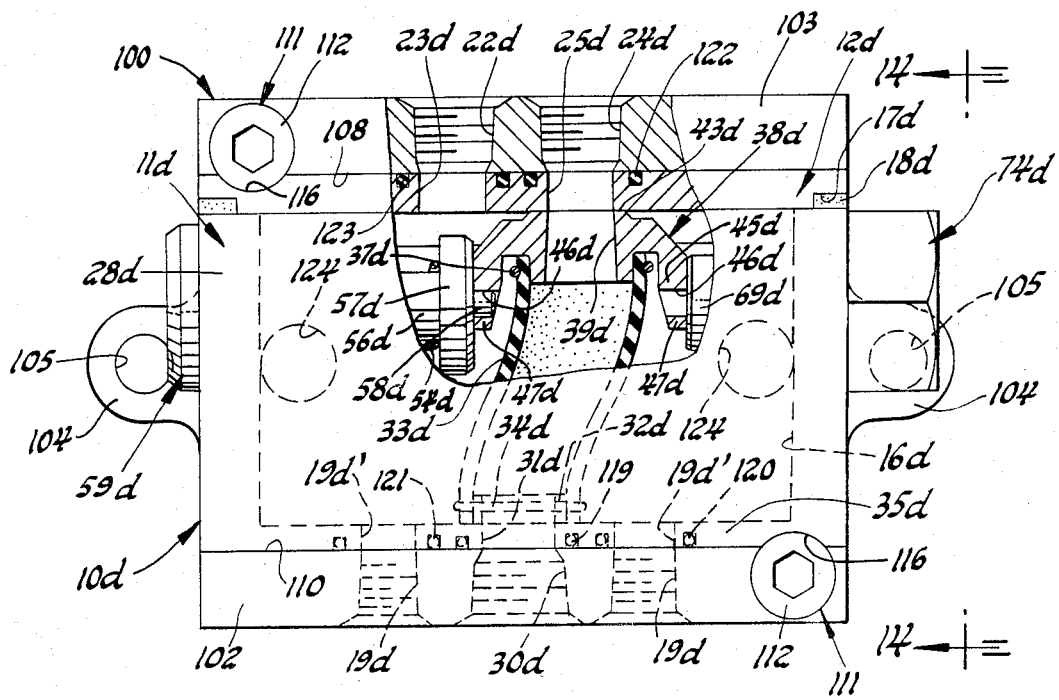
FIG. 13 is a side elevation view, partly in section, and with parts broken away, and showing a modification of the invention which employs a base member.
Figure 14:
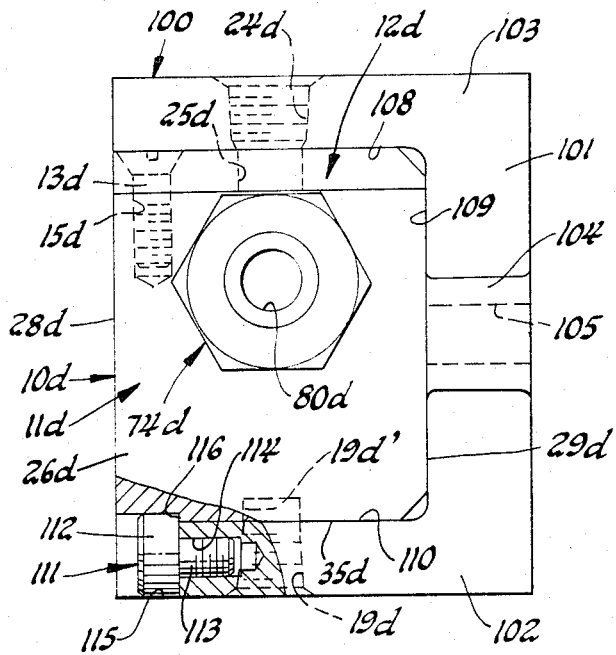
FIG. 14 is a right end elevation view of the valve structure illustrated in FIG. 13, taken along the line 14—14 thereof, and looking in the direction of the arrows.

FIGS. 13 and 14 illustrate a modification of the invention which employs a base member, generally indicated by the numeral 100 for supporting a valve 10d. The parts of the valve 10d which are the same as the parts of the valve 10, of the first embodiment illustrated in FIGS. 1 through 10, have been marked with the same reference numerals followed by the small letter "d". The valve 10d is structurally and functionally identical to the valve 10 of the first embodiment of FIGS. 1 through 10, and it is adapted to be releasably mounted in the valve base 100 for quick and easy replacement of the same, or repairs thereto. It will be understood that the various pipes or conduits which would be connected to the valve base 100, for conducting pressurized operating fluid to the valve 10d, and for conducting the pressurized fluid from the valve 10d to a fluid cylinder or the like, and for exhausting fluid therefrom through the valve 10d, would remain secured to the valve base 100 when the valve 10d is removed therefrom, for replacement or repair purposes.

As shown in FIGS. 13 and 14 the valve base 100 is reverse C-shaped, in transverse configuration. The valve base 100 includes a vertical rear wall 101, a horizontal, integral bottom wall 102, and an integral, horizontal top wall 103, which is parallel to the bottom wall 102. The bottom and top walls 102 and 103 are disposed perpendicular to the rear wall 101. The valve base 100 is open at the front, or left side thereof, as viewed in FIG. 14, to provide a valve receiving chamber in the base 100 which is bounded by inner surfaces 108, 109, and 110, of the top, rear, and bottom valve base walls, respectively. The last mentioned valve chamber is open at the ends thereof. As shown in FIGS. 13 and 14, the valve base 100 is provided with a pair of integral mounting feet or protuberances 104, through each of which is formed a bore 105 for the reception of a suitable attachment member, as a mounting bolt, for securing the valve base 100 in place at a desired location.

As shown in FIG. 14, the side elevational configuration of the valve 10d is rectangular, and the valve chamber cross section in the valve body 100 that is bounded by the wall surfaces 108, 109 and 110 is also rectangular. However, it will be understood that the outer transverse shape of the valve 10d may be made to any other shape, as for example a circular shape, and that the valve chamber in the valve body 100 would then be made to a corresponding complementary shape.

As shown in FIG. 13, the valve top plate of the valve 10d is indicated by the numeral 12d, and it has formed therethrough a pair of outlet passages 23d and 25d, in positions aligned with a pair of threaded outlet ports 22d and 24d, respectively, which are formed in the upper wall 103 of the valve base 100. The valve base lower end wall 102 has a threaded inlet port 30d formed therethrough, which is aligned with a passage 31d formed through the lower wall 35d of the valve body 11d. The inner end of the passage 31d has an integral flange which is attached to the flexible conduit 33d by a suitable retainer wire ring 34d. The valve base lower end wall 102 is also provided with a pair of threaded exhaust ports 19d which are aligned with a pair of inlet passages 19d' that are formed through the lower end wall 35d of the valve body 11d and communicate with the chamber 16d formed inside of the valve body 11d. As shown in FIG. 13 the valve 10d carries a suitable annular seal 119, that is mounted in a groove formed in the valve body lower end wall 35d around the outer end of the inlet passage 31d, for sealing engagement with the inner surface 110 of the valve base lower end wall 102. In like manner, suitable annular seals 120 and 121 are each mounted in a separate groove formed in the lower end wall 35d of the valve body 11d, for sealing engagement with the inner surface 110 of the valve base lower end wall 102. Suitable annular seals 122 and 123 are mounted in separate grooves formed in the valve body top plate 12d, around the outer end of the outlet passages 25d and 23d, respectively, for sealing engagement with the inner surface 108 of the valve base upper end wall 103.

As shown in FIG. 13, the valve 10d is releasably secured in the valve base 100 by any suitable means, as for example an upper and a lower socket head machine screw, which are identical, and generally indicated by the numeral 111. Each of the machine screws 111 includes a head 112 (FIG. 14) and the usual threaded shaft 113. The screw shaft 113 of the lower machine screw extends through an enlarged diameter bore 115 in the adjacent valve base lower end wall 102, and into threaded engagement with a threaded bore 114 in the valve body lower end wall 102. A portion of the bore 115 is partially formed in the adjacent surface of the valve front wall 28d, and the inner end of that bore portion is indicated by the numeral 116. Accordingly as shown in FIG. 13, the screw head 112 overlaps the valve front wall 28d and seats against the inner end surface 116 of the portion of bore 115 in the valve body 28d, so as to releasably secured the valve 10d in the valve base 100. The upper machine screw 111 (FIG. 13) is structurally and functionally the same as the lower machine screw 111.

The slider valve element 38d would be operated between a first operating position in alignment with the outlet port 24d, shown in FIG. 13, and a second operating position in alignment with the outlet port 22d, and then back to the first operating position by the same operator means 74d and return spring means employed in the valve 10 of the first embodiment of FIGS. 1 through 10. It will be seen, that the base mounted valve 10d of FIGS. 13 and 14 can be used individually, or in combination with similar valves, as in a stacked valve arrangement. As shown in FIG. 13, the numerals 124 designate a pair of holes formed through the valve base rear wall 101 for the purpose of allowing a knock-out tool to be extended therethrough for assisting the removal or separation of the valve 10d from the valve base 100.

Figure 15:
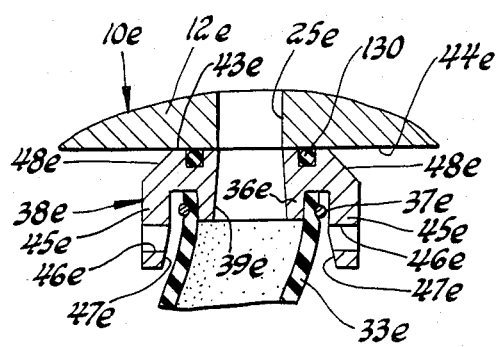
FIG. 15 is a fragmentary, vertical section view, similar to FIG. 12, showing the slider valve element of FIG. 12 provided with a seal member.

FIG. 15 illustrates the use of a seal means, between the top plate lower surface 44e and the circular lip 43e of a slider valve element 38e. FIG. 15 shows a slider valve element 38e in its operative relationship with a top plate 12e, and the parts of the embodiment of FIG. 15, which are the same as the first described embodiment of FIGS. 1 through 9 have been marked with the same reference numerals followed by the small letter "e". In the embodiment of FIG. 15, the slider valve element circular lip 43e, is provided with an annular groove on the upper end thereof, around the passage 39e, and operatively mounted therein is a suitable annular seal 130. The seal 130 slidably engages the lower surface 44e of the valve top plate 10e. The seal 130 may be of any suitable type and material, as for example, an O-ring and the like. The slider valve element 38e would be operated in the same manner, and with the same means, as described hereinbefore for the first embodiment of FIGS. 1 through 9.

Figure 16:
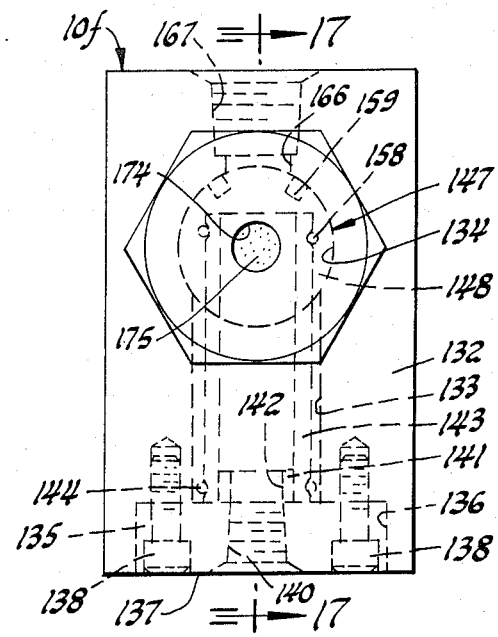
FIG. 16 is a side elevation view of another embodiment made in accordance with the principles of the present invention, and showing a four-way, two position directional fluid control, reversing valve constructed and arranged to provide a straight through flow path between the inlet port and the outlet or cylinder ports, and between the outlet or cylinder ports and exhaust ports.
Figure 17:
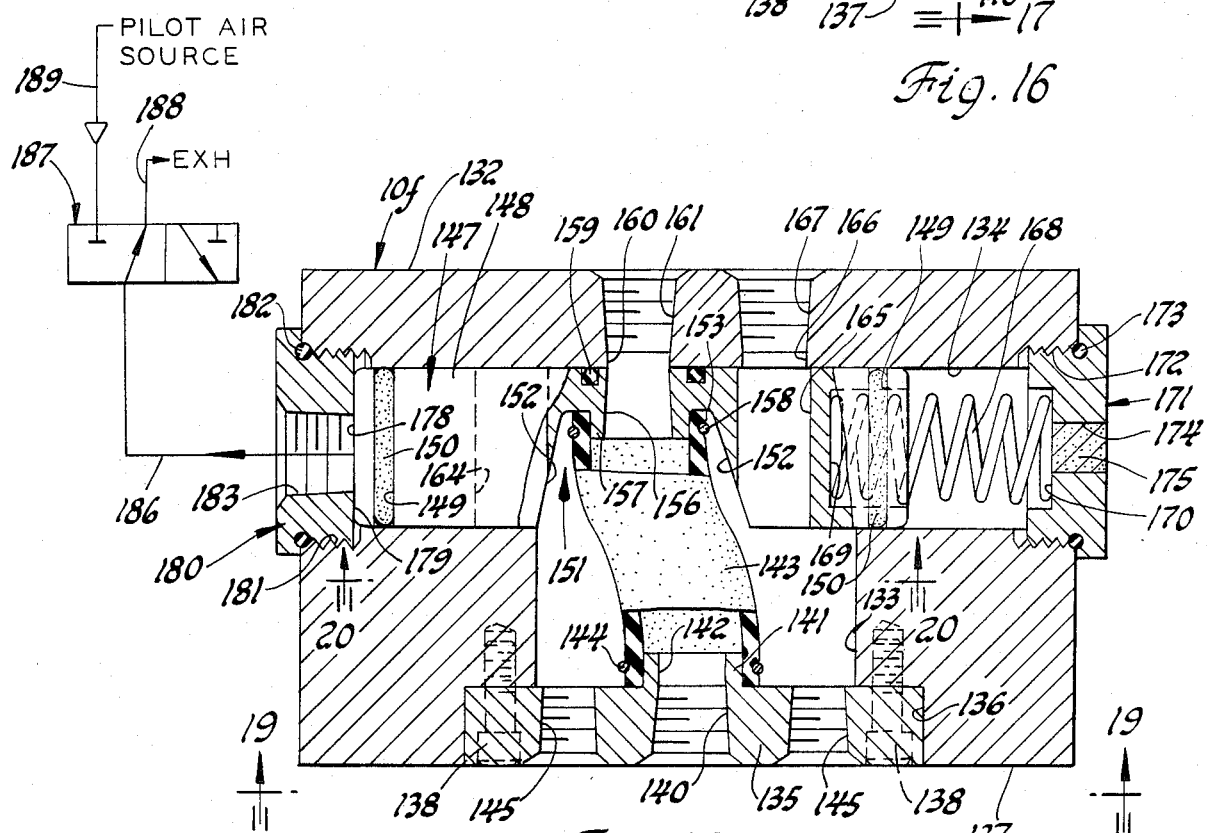
FIGS. 17 and 18 are elevation section views of the directional fluid control, reversing valve structure illustrated in FIG. 16, taken along the line 17—17 thereof, looking in the direction of the arrows, and showing the slider valve element in first and second operating positions, respectively.

FIGS. 16 through 19 disclose a valve, generally indicated by the numeral 10f, which comprises another embodiment of the invention that includes a one-piece valve body, and a cylindrical slider valve element. As shown in FIG. 17, the valve 10f includes an integral, one-piece body 132, which is rectangular in outer configuration. The valve body 132 has a substantially rectangular exhaust chamber 133 formed in the lower side thereof, which is open at the lower end thereof to the exterior of the valve. The valve body 132 includes a horizontally disposed, longitudinally extended, cylindrical bore 134 which forms a slider valve element cylinder. As shown in FIGS. 16 and 17, the lower end of the exhaust chamber 133 is enclosed by a suitable bottom cover plate 135, which is seated in a rectangular recess 136 formed in the bottom surface 137 of the valve body 132. The bottom cover plate 135 is releasably secured in the recess 136 by suitable machine screws 138.

Figure 18:
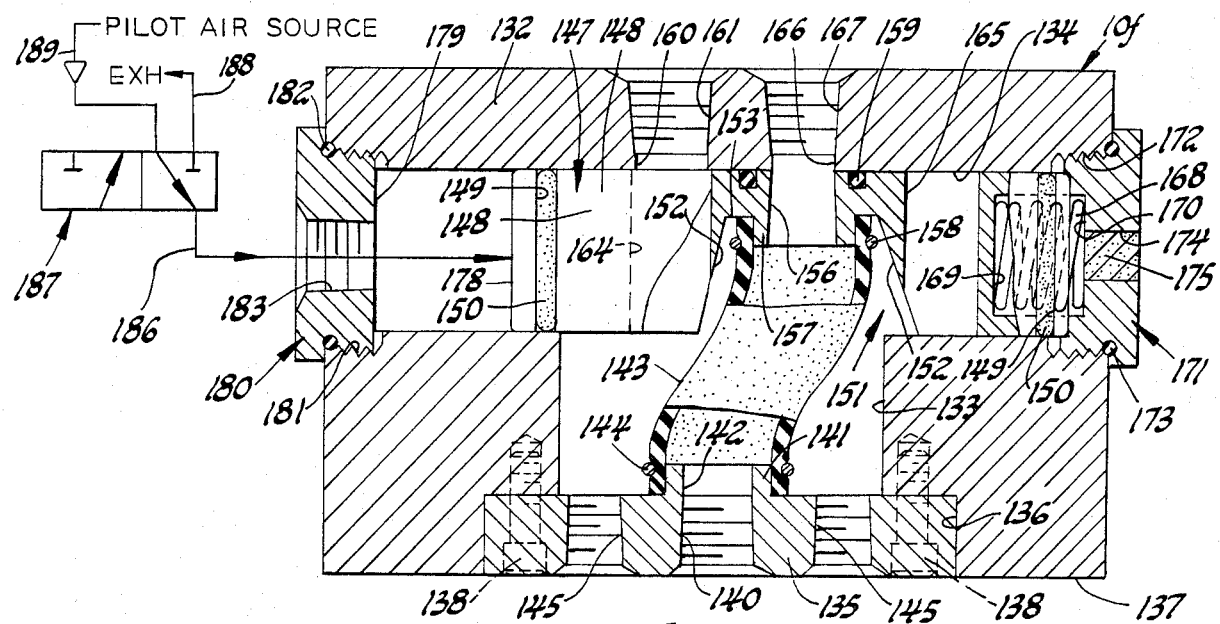
Figure 19:
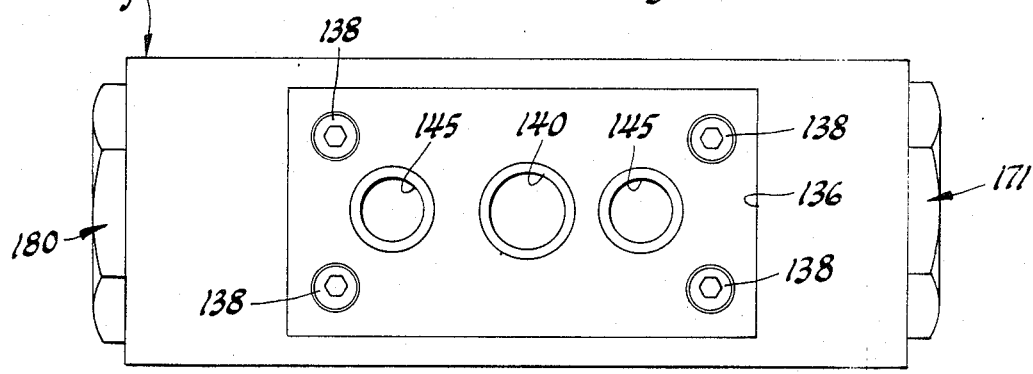
FIG. 19 is a bottom plan view of the directional fluid control, reversing valve structure illustrated in FIG. 17, taken along the line 19—19 thereof, and looking in the direction of the arrows.

The valve 10f is provided with a threaded inlet port 140, which is formed through the bottom cover plate 135, and communicates through a passage 142 in an integral tubular flange 141, that is formed on the inner side of the plate 135, with the interior of the lower end of the flexible, tubular conduit 143. The lower end of the flexible, tubular conduit 143 is seated around the flange 141, and is fixedly secured thereto, by any suitable retainer means, as for example, a retainer wire ring 144. As shown in FIGS. 17 and 18, a pair of exhaust ports 145 are formed through the bottom cover plate 135, in positions on opposite sides of the inlet port 140.

Figure 20:
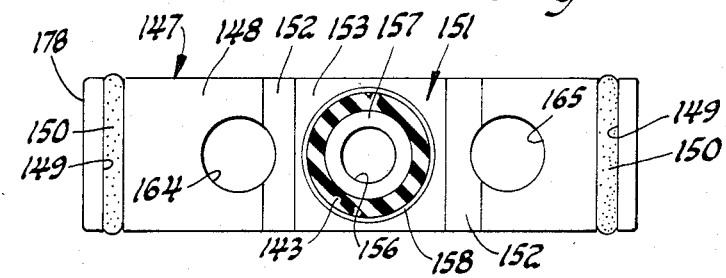
FIG. 20 is a bottom plan view of the slider valve element employed in the embodiment of FIG. 17, taken along the line 20—20 thereof, looking in the direction of the arrows, and with the other parts of the valve removed.

The valve 10f includes a slider valve element, which is generally indicated by the numeral 147, and it comprises an elongated, cylindrical body 148. The slider valve body 148 is provided at each end thereof with an annular seal groove 149, in which is operatively mounted a suitable annular seal 150, for sealing engagement with the surface of the slider valve bore cylinder 134, as for example, a suitable O-ring seal. If however, the clearance between valve element 147 and bore 134 is of minimum clearance, than seal 150 may be omitted. As shown in FIGS. 17 and 20, the slider valve element body 148 has a transverse recess, generally indicated by the numeral 151, formed therethrough, and it extends upwardly from the bottom thereof, and communicates at the lower end thereof with the exhaust chamber 133 in the valve body 132. The recess 151 has transverse upwardly and inwardly sloping wall surfaces 152, as shown in FIG. 17, and they terminate at an upper point in the slider valve body 148 that is indicated by the numeral 152 in FIG. 17. An outlet passage 156 is formed through the upper end of the slider valve element body 148, as viewed in FIG. 17, and it extends downwardly through an internal tubular flange 157. As shown in FIG. 17, the upper end of the flexible, tubular conduit 143 is fixedly secured around the outer periphery of the integral flange 157 by any suitable retainer means, as by a retainer wire ring 158. The outer end of the outlet passage 156 is surrounded by a suitable annular seal 159, mounted in a suitable annular groove around the outer end of the outlet passage 156, for sealing engagement with the wall surface of the slider valve cylinder 134. Any suitable seal may be used for carrying out the function of the seal 159, such as a suitable O-ring seal.

As shown in FIG. 17, the slider valve element 147 is in a first operating position, whereby the outlet passage 156 through the slider valve element is aligned with, and communicates with, a cylinder passage 160 in the upper end of the valve body 132. The outer end of the cylinder passage 160 communicates with the inner end of a first threaded outlet or cylinder port 161.

As shown in FIG. 17, the slider valve element 147 is provided with a pair of exhaust passages which are formed vertically therethrough, with a first exhaust passage or bore 164 being spaced apart to the left of the inlet passage 156, and a second exhaust passage or bore 165 being disposed to the right of the inlet passage 156. The exhaust passages 164 and 165 are disposed on opposite sides of the inlet passage 156, at equidistant positions apart from the inlet passage 156.

As shown in FIG. 17, when the slider valve element 147 is in the first operating position, the second exhaust passage 165 is aligned with a second cylinder passage 166, which communicates at its outer end with a second outlet or cylinder port 167.

When the slider valve element 147 is moved to the right, from the first operating position shown in FIG. 17, it is disposed then in the second operating position with the inlet passage 156 communicating with the second cylinder port 167, and the first exhaust passage 164 in alignment with the first cylinder port 161.

As shown in FIG. 17, the slider valve element 147 is moved to the first operating position, and held at said position, by a return spring 168. The return spring 168 has its inner end seated in an inwardly extended recess 169, which is formed in the right end of the slider valve element 147, as viewed in FIG. 17. The outer end of the return spring 168 is seated in an annular recess 170, which extends outwardly, into the inner side of a spring retainer member, generally indicated by the numeral 171. The spring retainer 171 is threadably mounted in the enlarged diameter, threaded end portion 172 of the right end of the slider valve element cylinder 134. The spring retainer 171 is provided with a suitable seal, such as an O-ring seal 173. The spring retainer 171 is provided with an axial vent hole 174 therethrough, in which is operatively mounted a suitable air filter 175.

As shown in FIG. 17, when the slider valve element 147 is in the first operating position the return spring 168 biases the slider valve element 147 to the left, so that its left outer end 178 seats against the inner face 179 of a retainer member, generally indicated by the numeral 180. The retainer member 180 is threadably mounted in a threaded bore 181, which is formed in the left side of the valve body 132 and it is provided with a suitable seal means, as for example an O-ring 182. The retainer member 180 is provided with an axially, threaded inlet port or hole 183 for connection to a suitable source of pressurized pilot air.

In use, it will be seen that the slider valve element 147 may be moved from its first operating position shown in FIG. 17, to the right, as viewed in FIG. 18, against the pressure of the return spring 168. The movement of the slider element 147 to the second operating position of FIG. 18, is effected by conducting pressurized pilot air into the pilot air inlet port 183, and against the left end of the slider valve element 147 to move it from the first operating position shown in FIG. 17 to the second operating position shown in FIG. 18.

It will be seen that the longitudinal axis of the inlet port 140 and the outlet ports 161 and 167 are co-planar, and that when the slider valve element 147 is in the first operating position shown in FIG. 17, that pressurized fluid from a suitable source of the same may enter the inlet port 140, and pass through the passage 142, the tubular conduit 143, and through the passages 156 and 160, and out the cylinder or outlet port 161 in a straight through flow path, without the need for making any right angle turns, on either a horizontal plane or a vertical plane. Simultaneously, fluid is exhausted from the apparatus being controlled by the valve 10f, through a flow path from said apparatus and the cylinder port 167, and through the exhaust passage 165 and into the exhaust chamber 133, and out through the exhaust ports 145. When the slider valve element 147 is moved to the second operating position, shown in FIG. 18, pressurized fluid is conducted from the inlet port 140, and through the conduit 143 and out the cylinder or outlet port 167 in a similar straight through flow path. Simultaneously, fluid is exhausted from the apparatus being controlled by the valve 10, through a flow path from said apparatus and the cylinder port 161, and through the exhaust passage 164 and into the exhaust chamber 133, and out the exhaust ports 145.

As illustrated in FIG. 17, pressurized pilot air is conducted to the pilot air inlet port 182 by a suitable conduit 186, which is connected to a suitable directional control valve, generally indicated by the numeral 187. The directional control valve 187 is a conventional type valve, and it has an exhaust line 188 and a supply line 189 connected to a suitable source of pressurized pilot air. When the directional control valve 187 is in the first operating position shown in FIG. 17, the pilot air would be exhausted from the pilot air port 183. The return spring 168 would retain the slider valve element 147 in the position shown in FIG. 17. When the directional flow control valve 187 is moved to the left, as viewed in FIG. 17, by any suitable means, as by a manual means or a solenoid operated means, the valve 187 would be moved to the position shown in FIG. 18. Pressurized pilot air is then conducted from the pilot source line 189, and into the pilot air port 183 and against the left end of the slider valve element 147 to move it to the right to the second operating position shown in FIG. 18. When it is desired to move the slider valve element 147 back to the first operating position of FIG. 17, the directional control valve 187 is reversed, to move it back to the position shown in FIG. 17, so as to cut off the supply of pressurized pilot air to the pilot port 183 and to exhaust the pressurized air that is within that port, and to permit the return spring 168 to return the slider valve element 147 to the first operating position shown in FIG. 17.

Figure 21:
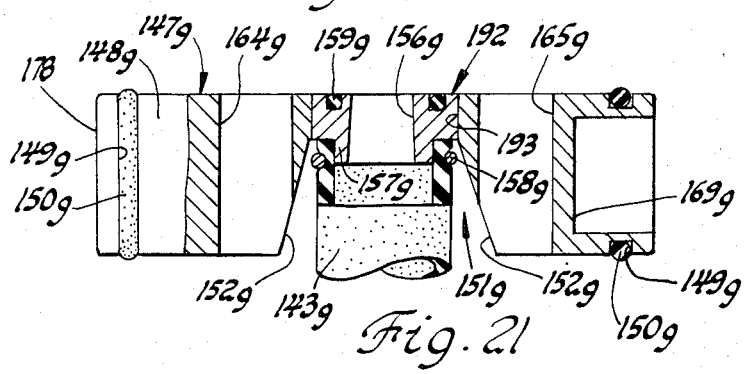
FIGS. 21 and 22 are elevation section and fragmentary top views, respectively, of a modified slider valve element made in accordance with the invention, and adapted to be used in the embodiment of FIGS. 16 through 19.
Figure 22:
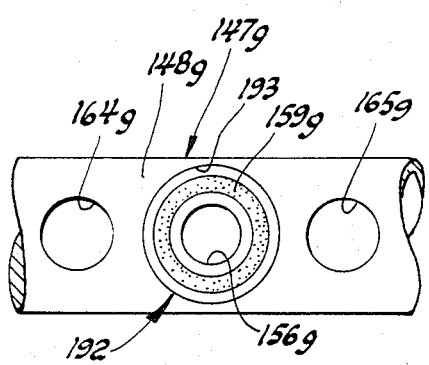

FIG. 21 is an elevation view, partly in section, of a modified slider valve element 147g adapted for use in the embodiment illustrated in FIGS. 16 through 19. FIG. 22 is a fragmentary, top plan view of the slider valve element 147g shown in FIG. 21. The parts of the slider valve element 147g embodiment illustrated in FIGS. 21 and 22, which are the same as the parts of the slider valve element 147 of the embodiment of FIGS. 16 through 20, have been marked with the same reference numerals followed by the small letter "g". The slider valve element 147g of FIGS. 21 and 22 differs from the slider valve element 147 illustrated in FIG. 17 by having the central portion 192 that carries the passage 156g, and the flange 157g for attaching the conduit 143g thereto, separately made and mounted in the slider valve element body 148g. The numeral 192 generally designates a cylindrical carrier member which is slidably mounted in a vertical bore 193, that is centrally formed through the slider valve element body 148g. The circular bore 193 extends from the upper side of the slider valve element body 148g and communicates with the upper end of the transverse recess 151g through the slider valve element body 148g. The cylindrical carrier member 192 is slidably fitted into the bore 193 so that the pressure of the fluid in the tubular conduit 143g assists the sealing function. The carrier member 192 is arcuately formed on the upper end thereof, to mate with the cylindrical surface of the bore 134 in the valve body 132. The tubular flang 157g has fixedly connected thereto the upper end of the flexible, tubular conduit 143g. The slider valve element 147g would function in the valve embodiment of FIGS. 16 through 19 in the same manner as described hereinbefore for the slider valve element 147.

Figure 23:
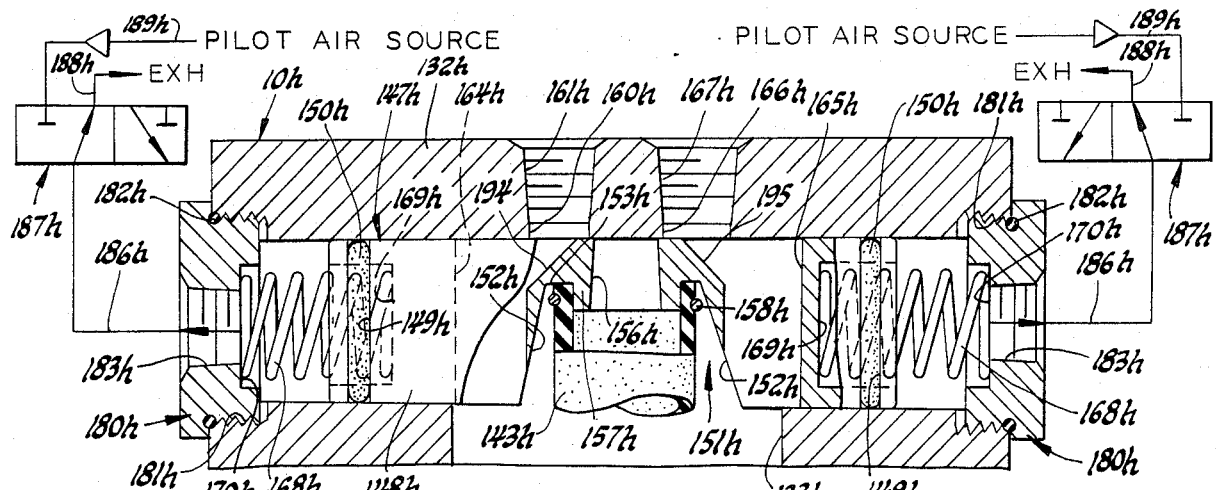
FIGS. 23, 24 and 25 are fragmentary, elevation section views of a four-way, three-position, open center, directional fluid control, reversing valve made in accordance with the invention, similar to the valve shown in FIGS. 16 through 20, and showing the three positions.
Figure 24:
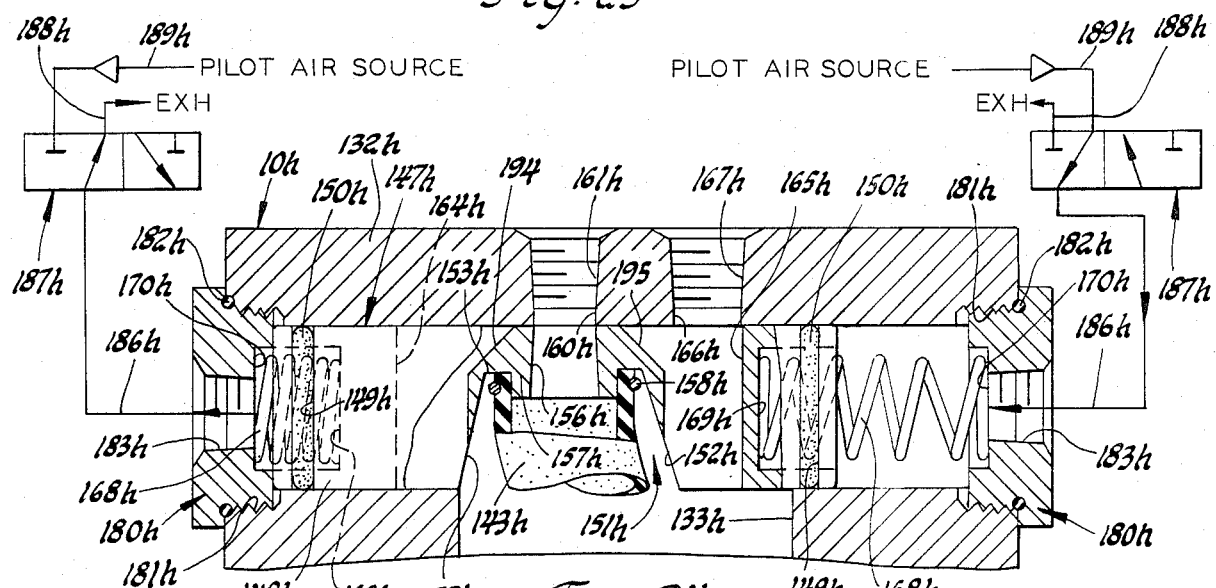
Figure 25:
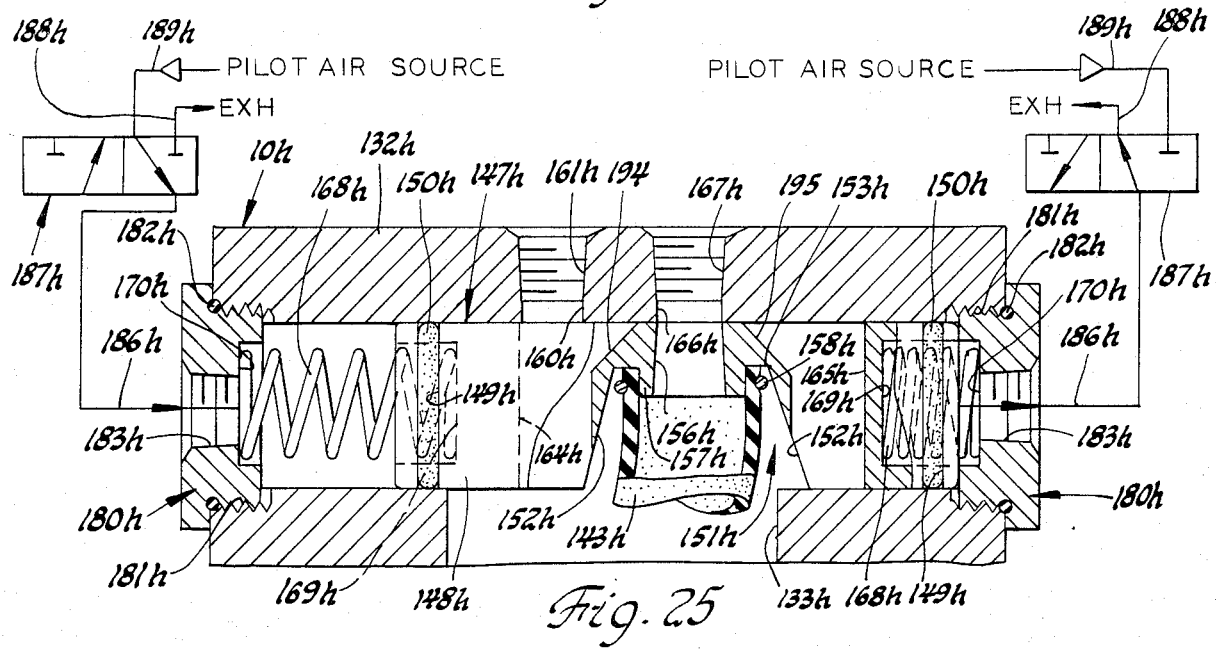

FIGS. 23, 24 and 25 are fragmentary, elevational section views of a modification of the directional fluid control, reversing valve illustrated in FIGS. 17 and 18, so as to provide a four-way, three position, open center, directional, reversing valve, generally indicated by the numeral 10h. The parts of the embodiment of FIGS. 23 through 25, which are the same as the parts of the embodiment of FIGS. 17 and 18 have been marked with the same reference numerals followed by the small letter "h".

In the embodiment of FIGS. 23 through 25, the valve 10h is provided with a pair of matched return springs 168h and spring retainers 180h, which function to normally hold the slider valve element 147h in an open center, inoperative position, with the inlet passage 156h disposed between the outlet or cylinder ports 161h and 167h, so as to block the flow of fluid from the inlet passage 156h into either one of the last mentioned outlet ports. When the slider valve element 147h is in the open center, inoperative position shown in FIG. 23, the outlet ports 161h and 167h are in communication with exhaust passages 164h and 165h through interconnecting passageways 194 and 195, respectively. The slider valve element 147h would be moved left or right, from the centered inoperative position shown in FIG. 23, by pressurized pilot air, in the same manner as described hereinbefore, for moving 5the slider valve element 147 of FIG. 17 to the right against the pressure of the return spring 168. When the slider valve element 147h is in the centered inoperative position shown in FIG. 23, both of the directional control valves 187h would be in the positions shown, so as to exhaust both of the pilot air ports 183h of any pilot air.

FIG. 24 shows the right end pilot air directional, control valve 187h moved to the right to admit pressurized pilot air to the right pilot port 183h to engage the slider valve element 147h, and move it leftward into a first operating position, to align the inlet passage 156h with the outlet port 161h, while maintaining communication between the other outlet port 167h and the exhaust passage 165h and exhaust chamber 133h. When the right end pilot air directional control valve 187h is reversed, so as to exhaust pilot air from the right end pilot air port 183h, the left end return spring 168h then returns the slider valve element 147h to the open center, inoperative position shown in FIG. 23. FIG. 25 shows the slider valve element 147h moved to the right to a second operating position, by means of pressurized pilot air being admitted through the left end pilot air port 183h, in the same manner as described for the valve of FIG. 24, to effect movement of the slider valve element 147h to the right. When the pilot air pressure is exhausted from the left end pilot air port 183h, the right end return spring 168h returns the slider valve element 147h to the open center, inoperative position as shown in FIG. 23.

Figure 26:
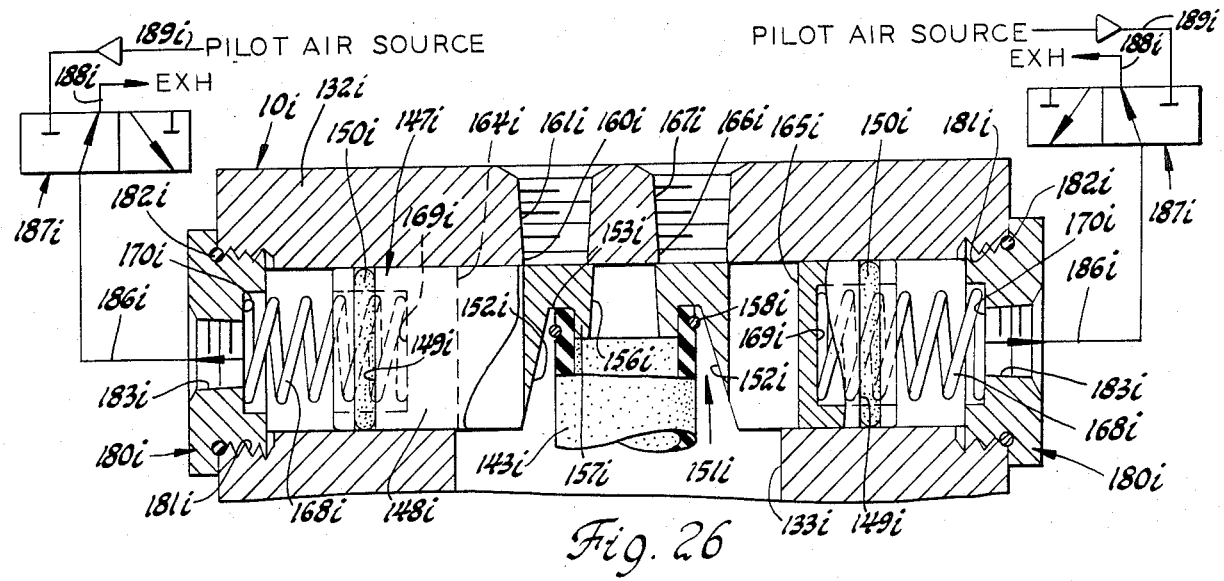
FIGS. 26, 27 and 28 are fragmentary, elevation section views of a four-way, three-position, closed center directional fluid control, reversing valve made in accordance with the invention, similar to the valve shown in FIGS. 16 through 20, and showing the three positions.
Figure 27:
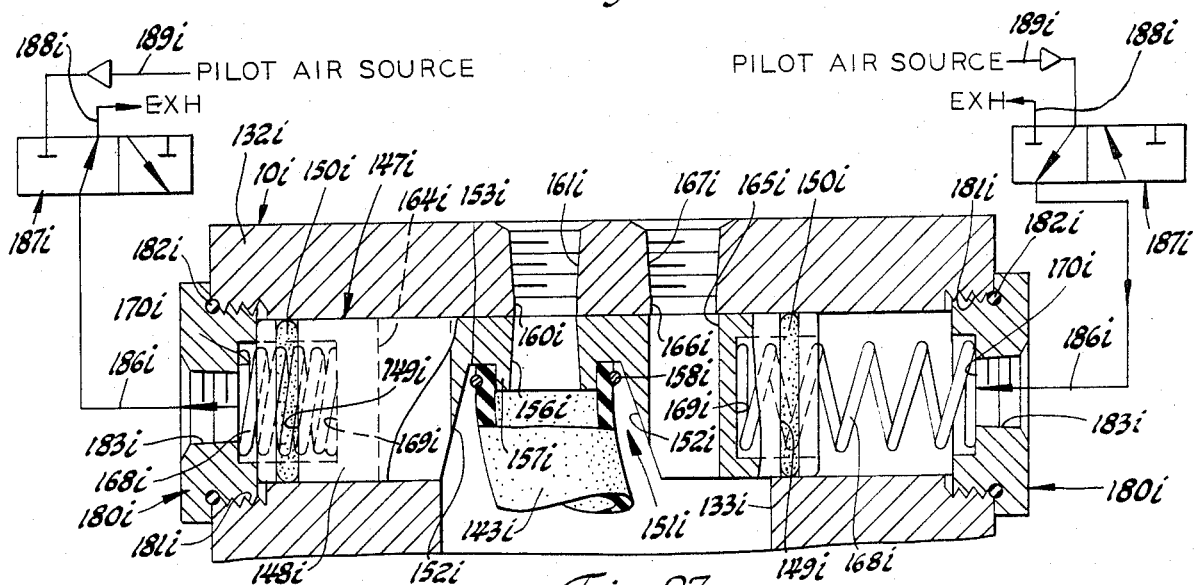
Figure 28:
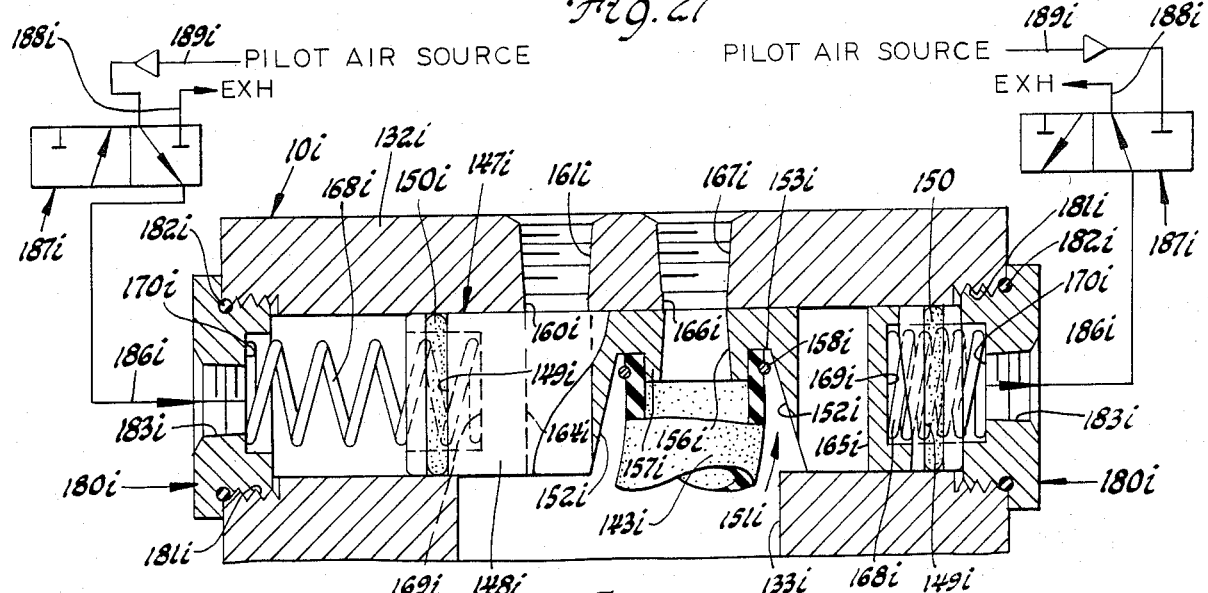

FIGS. 26, 27 and 28 are fragmentary, elevational section views of a modification of the direction fluid control, reversing valve illustrated in FIGS. 17 and 18, so as to provide a four-way, three position, closed center, directional, reversing valve, generally indicated by the numeral 10i. The parts of the embodiment of FIGS. 26 through 28, which are the same as the parts of the embodiment of FIGS. 17 and 18 have been marked with the same reference numerals followed by the small letter "i".

In the embodiment of FIGS. 26 through 28, the valve 10i is provided with a pair of matched return springs 168a and spring retainers 180i, which function to normally hold the slider valve element 147i in a closed center, inoperative position, with the inlet passage 156i disposed between the outlet or cylinder ports 161i and 167i, so as to block the flow of fluid from the inlet passage 156i into either one of the last mentioned outlet ports. When the slider valve element 147i is in the closed center, inoperative position shown in FIG. 26, the outlet ports 161i and 167i are not in communication with the exhaust passages 164i and 165i. The slider valve element 147i would be moved left or right, from the centered inoperative position shown in FIG. 26, by pressurized pilot air, in the same manner as described hereinbefore, for moving the slider valve element 147 of FIG. 17 to the right against the pressure of the spring 168. When the slider valve element 147i is in the centered inoperative position shown in FIG. 26, both of the directional control valves 187i would both be in the positions shown, so as to exhaust both of the pilot air ports 183i of any pilot air.

FIG. 27 shows the right end pilot air directional, control valve 187i moved to the right to admit pressurized pilot air to the right pilot port 183i and to engage the slider valve element 147i, and move it leftward into a first operating position, to align the inlet passage 156i with the outlet port 161i, and initiate communication between the other outlet port 167i and the exhaust passage 165i and exhaust chamber 133i. When the right end pilot air directional control valve 187i is reversed, so as to exhaust air from the right end pilot air port 183i, the left end return spring 168i then returns the slider valve element 147i to the closed center, inoperative position shown in FIG. 26. FIG. 28 shows the slider valve element 147i moved to the right to a second operating position, by means of pressurized pilot air being admitted through the left end pilot air port 183i, in the same manner as described for the valve of FIG. 27, to effect movement of the slider valve element 147i to the right. When the pilot air pressure is exhausted from the left end pilot air port 183i, the right end return spring 168i returns the slider valve element 147i to the closed center, inoperative position as shown in FIG. 26.

INDUSTRIAL APPLICABILITY

The valve of the present invention is adapted for use in industrial air and hydraulic fluid directional control valves of the two-way, three-way or four-way two and three-position type, and the like, for directing fluid flow to control apparatuses, such as cylinders, for machine tool operations, and other industrial applications.

What is claimed is:

1. A reversing fluid directional control valve, characterized in that it includes:
   (a) a valve body having an enclosed exhaust chamber therein and at least two oppositely disposed sides;
   (b) outlet port means formed through one of said sides of said valve body and communicating with said exhaust chamber;
   (c) a fixed inlet port means formed through the other of said two sides of said valve body, and communicating with said exhaust chamber;
   (d) an exhaust port means in the valve body and connecting said exhaust chamber to the exterior of the valve body;
   (e) a conduit valve means disposed in said chamber and having two ends, with one end being operatively connected to the inner end of said inlet port means and the other end being movable to a first operating position and to a second operating position, for selectively directing pressurized fluid entering said inlet port means to said outlet port means in a straight through flow path, and wherein, the end of said straight through flow path at the movable end of the conduit valve means is co-axial with the outlet port means when the conduit valve means is in said first and second operating positions, and fluid entering said outlet port means flows through said exhaust chamber and out the exhaust port means; and,
   (f) operator means for moving said conduit valve means movable end to said first operating position and to said second operating position.

2. A reversing fluid directional control valve as defined in claim 1, characterized in that:
   (a) the valve body includes a bottom side wall, and a top side wall having a lower side surface; and,
   (b) said outlet port means is formed through said top side wall, and the inlet port means is formed through said bottom side wall.

3. A reversing fluid directional control valve as defined in claim 2, characterized in that:
   (a) said exhaust port means is formed through said bottom wall.

4. A reversing fluid directional control valve, as defined in either one of claims 2 or 3, characterized in that:
   (a) said conduit valve means includes a slider valve element, with an outlet passage, on said movable end for sliding movement, on the top side wall lower side surface, to said first and second operating positions.

5. A reversing fluid directional control valve, as defined in claim 4, characterized in that said operator means for moving said conduit valve means movable end to said first and second operating positions includes:
   (a) a first operator means engagable with one end of the slider valve element for moving the slider valve element to said first operating position, and a second operator means engagable with the opposite end of said slider valve element for moving the slider valve element to said second operating position.

6. A reversing fluid directional control valve as defined in claim 5, characterized in that:
   (a) the slider valve element is provided with a pressure assist seal engagement, with the top side wall lower side surface, by the pressurized fluid flowing through the conduit valve means during operation of the valve.

7. A reversing fluid directional control valve as defined in claim 5, characterized in that:
   (a) the directional control valve is detachably mounted on a valve base; and,
   (b) the valve base is provided with inlet, outlet and exhaust port means which communicate with the inlet, outlet and exhaust port means, respectively, in the directional control valve to provide for straight through fluid flow through the valve and valve base, during operation of the valve.

8. A reversing fluid directional control valve, as defined in claim 5, characterized in that:
    (a) said slider valve element is provided with a seal means for sealing engagement with the top side wall lower side surface.

9. A reversing fluid directional control valve as defined in claim 5, characterized in that:
    (a) said slider valve element comprises an elongated cylindrical body slidably mounted in a cylindrical bore in the valve body that is positioned between the outlet ports and the exhaust chamber in the valve body, and which is provided with an outlet passage means and an exhaust passage means.

10. A reversing fluid directional control valve as defined in claim 9, characterized in that:
    (a) said slider valve element elongated cylindrical body is provided with a seal means around the outlet passage for sealing engagement with the bore in the valve body.

11. A reversing fluid directional control valve, as defined in claim 9, characterized in that:
    (a) said slider valve element elongated cylindrical body, has a separately formed carrier member movably mouned therein which provides a pressure assist to the sealing engagement with the bore in the valve body, and which has an outlet passage formed therethrough.

12. A reversing fluid directional control valve, as defined in claim 11, characterized in that:
    (a) said slider valve element carrier member is provided with a seal means around the outlet passage for sealing engagement with the bore in the valve body.

13. A reversing fluid directional control valve, as defined in claim 5, characterized in that:
    (a) said top side wall comprises a top plate having a lower side surface.

14. A reversing fluid directional control valve, as defined in claim 5, characterized in that:
    (a) said outlet port means comprises a first outlet port that communicates with said conduit valve means movable end when it is in the first operating position, and a second outlet port that communicates with the conduit valve means movable end when it is in the second operating position.

15. A reversing fluid directional control valve, as defined in claim 5, characterized in that:
    (a) said outlet port means comprises a normally open outlet port that communicates with the conduit valve means movable end when it is in the first operating position, and the flow through the conduit valve means movable end is blocked when the conduit valve means movable end is in the second operating position.

16. A reversing fluid directional control valve, as defined in claim 5, characterized in that:
    (a) said outlet port means comprises a normally closed outlet port wherein the flow through the conduit valve means movable end and through the outlet port is normally blocked when the conduit valve means movable end is in the first operating position, and said outlet port communicates with the conduit valve means movable end when it is in the second operating position.

17. A reversing fluid directional control valve, as defined in claim 5, characterized in that:
    (a) said outlet port means comprises a first outlet port that communicates with said conduit valve means movable end when it is in said first operating position, and a second outlet port that communicates with the conduit valve means movable end when it is in said second operating position; and,
    (b) said valve includes biasing means engagable with opposite sides of the conduit valve means movable end to retain the same in a centered inoperative position between said first and second outlet ports, and between said first and second operating positions, and with said first and second outlet ports in open communication with said exhaust chamber.

18. A reversing fluid directional control valve, as defined in claim 17, characterized in that:
    (a) said biasing means comprises spring means.

19. A reversing fluid directional control valve, as defined in claim 5, characterized in that:
    (a) said outlet port means comprises a first outlet port that communicates with said conduit valve means movable end when it is in said first operating position, and a second outlet port that communicates with the conduit valves means movable end when it is in said second operating position; and,
    (b) said valve includes biasing means engagable with opposite sides of the conduit valve means movable end to retain the same in a centered inoperative position between said first and second outlet ports, and between said first and second operating position, and with said first and second outlet ports closed to communication with said exhaust chamber.

20. A reversing fluid directional control valve, as defined in claim 5, characterized in that:
    (a) said outlet port means comprises a first outlet port that communicates with said conduit valve means movable end when it is in said first operating position, and a second outlet port that communicates with the conduit valve means movable end when it is in said second operating position;
    (b) said slider valve element comprises an elongated cylindrical body, with an outlet passage, slidably mounted in a cylindrical bore in the valve body, between the outlet ports and said exhaust chamber in the valve body, and provided with an exhaust passage on opposite sides of the outlet passage; and,
    (c) said valve includes biasing means engagable with opposite sides of the conduit valve means movable end to retain the same in a centered inoperative position between said first and second outlet ports, and with said first and second outlet ports in open communication with said exhaust chamber through the exhaust passages on opposite sides of the slider valve element outlet passage.

21. A reversing fluid directional control valve, as defined in claim 5, characterized in that:
    (a) said outlet port means comprises a first port that communicates with said conduit valve means movable end when it is in said first operating position, and a second outlet port that communicates with the conduit valve means movable end when it is in said second operating position;
    (b) said slider valve element comprises an elongated cylindrical body, with an outlet passage, slidably mounted in a cylindrical bore in the valve body, between the outlet ports and said exhaust chamber in the valve body, and provided with an exhaust passage on opposite sides of the outlet passage; and,
    (c) said valve includes biasing means engageable with opposite sides of the conduit valve means movable end to retain the same in a centered inoperative position between said first and second outlet ports, and with said first and second outlet ports closed to communication with said exhaust chamber.

* * * * *